United States Patent
Raja et al.

(10) Patent No.: US 11,550,820 B2
(45) Date of Patent: Jan. 10, 2023

(54) SYSTEM AND METHOD FOR PARTITION-SCOPED SNAPSHOT CREATION IN A DISTRIBUTED DATA COMPUTING ENVIRONMENT

(71) Applicant: Oracle International Corporation, Redwood Shores, CA (US)

(72) Inventors: Harvey Raja, Manchester (GB); Gene Gleyzer, Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 548 days.

(21) Appl. No.: 15/891,198

(22) Filed: Feb. 7, 2018

(65) Prior Publication Data

US 2018/0314749 A1 Nov. 1, 2018

Related U.S. Application Data

(60) Provisional application No. 62/491,706, filed on Apr. 28, 2017.

(51) Int. Cl.
| | |
|---|---|
| G06F 11/14 | (2006.01) |
| G06F 16/27 | (2019.01) |
| G06F 11/30 | (2006.01) |

(52) U.S. Cl.
CPC ........ *G06F 16/278* (2019.01); *G06F 11/1458* (2013.01); *G06F 11/302* (2013.01);
(Continued)

(58) Field of Classification Search
None
See application file for complete search history.

(56) References Cited

U.S. PATENT DOCUMENTS

| | | | |
|---|---|---|---|
| 5,784,569 A | 7/1998 | Miller | |
| 5,819,272 A | 10/1998 | Benson | |

(Continued)

FOREIGN PATENT DOCUMENTS

EP 0928089 A2 7/1999

OTHER PUBLICATIONS

Oracle®, Oracle® Database, JDBC Developer's Guide 12c Release 1 (12.1), Jun. 2014, Copyright © 1999, 2014, 520 pages.

(Continued)

*Primary Examiner* — Mark D Featherstone
*Assistant Examiner* — Navneet Gmahl
(74) *Attorney, Agent, or Firm* — Tucker Ellis LLP

(57) ABSTRACT

A system and method for partitioned snapshot creation of caches in a distributed data grid is provided. The system and method enables a snapshot to be created in a running system without quiescing a cache service. Moreover for each particular partition, execution of read/write requests are not blocked during the period that a snapshot creation task is being performed for the particular partition. The cache service thread continues to execute read requests for all partitions with write requests for the partition under snapshot experiencing delayed response. The system and method reduces the period of time for which partitions are unavailable during a snapshot process and increases the availability of cache services provided by a distributed data grid compared to prior snapshot systems.

18 Claims, 4 Drawing Sheets

(52) U.S. Cl.
CPC ...... *G06F 11/3017* (2013.01); *G06F 11/3072* (2013.01); *G06F 2201/80* (2013.01); *G06F 2201/84* (2013.01); *G06F 2201/865* (2013.01); *G06F 2201/885* (2013.01)

(56) References Cited

U.S. PATENT DOCUMENTS

| | | | |
|---|---|---|---|
| 5,933,818 | A | 8/1999 | Kasravi |
| 5,940,367 | A | 8/1999 | Antonov |
| 5,991,894 | A | 11/1999 | Lee |
| 5,999,712 | A | 12/1999 | Moiin |
| 6,078,930 | A | 6/2000 | Lee |
| 6,453,426 | B1 | 9/2002 | Gamache |
| 6,487,622 | B1 | 11/2002 | Coskrey |
| 6,553,389 | B1 | 4/2003 | Golding |
| 6,605,120 | B1 | 8/2003 | Fields |
| 6,693,874 | B1 | 2/2004 | Shaffer |
| 6,871,222 | B1 | 3/2005 | Frank |
| 6,952,758 | B2 | 10/2005 | Chron |
| 7,020,695 | B1 | 3/2006 | Kundu |
| 7,139,925 | B2 | 11/2006 | Dinker |
| 7,228,320 | B2 * | 6/2007 | Shitomi ............ G06F 16/10 |
| 7,260,698 | B2 | 8/2007 | Hepkin |
| 7,340,640 | B1 * | 3/2008 | Karr ............ G06F 3/0613 711/209 |
| 7,376,953 | B2 | 5/2008 | Togasaki |
| 7,451,359 | B1 | 11/2008 | Coekaerts |
| 7,464,378 | B1 | 12/2008 | Lmaye |
| 7,543,046 | B1 | 6/2009 | Bae |
| 7,613,774 | B1 | 11/2009 | Caronni |
| 7,640,339 | B1 | 12/2009 | Caronni |
| 7,698,390 | B1 | 4/2010 | Harkness |
| 7,720,971 | B2 | 5/2010 | Moutafov |
| 7,739,677 | B1 | 9/2010 | Kekre |
| 7,792,977 | B1 | 9/2010 | Brower |
| 7,814,248 | B2 | 10/2010 | Fong |
| 7,827,350 | B1 * | 11/2010 | Jiang ............ G06F 11/1469 711/114 |
| 7,882,067 | B2 | 2/2011 | Saika |
| 7,953,861 | B2 | 5/2011 | Yardley |
| 7,975,288 | B2 | 7/2011 | Viavant |
| 7,979,457 | B1 | 7/2011 | Garman |
| 8,074,035 | B1 * | 12/2011 | Per ............ G06F 11/1458 711/162 |
| 8,209,307 | B2 | 6/2012 | Erofeev |
| 8,281,293 | B2 | 10/2012 | Fulton |
| 8,285,692 | B2 | 10/2012 | Johnson |
| 8,312,439 | B2 | 11/2012 | Kielstra |
| 8,397,227 | B2 | 3/2013 | Fan |
| 8,402,464 | B2 | 3/2013 | Dice |
| 8,595,714 | B1 | 11/2013 | Hamer |
| 8,812,612 | B1 * | 8/2014 | Laier ............ G06F 16/172 709/213 |
| 9,135,268 | B2 | 9/2015 | Dash |
| 9,609,060 | B2 | 3/2017 | Kan |
| 9,635,132 | B1 * | 4/2017 | Lin ............ G06F 3/0652 |
| 9,652,376 | B2 | 5/2017 | Kuzmin |
| 9,852,149 | B1 * | 12/2017 | Taylor ............ G06F 11/2089 |
| 10,296,594 | B1 * | 5/2019 | Datta ............ G06F 16/172 |
| 10,324,803 | B1 * | 6/2019 | Agarwal ............ G06F 11/1448 |
| 10,430,378 | B1 * | 10/2019 | Harter ............ G06F 16/16 |
| 10,620,866 | B1 * | 4/2020 | Kumar ............ G06F 3/0644 |
| 10,733,153 | B2 * | 8/2020 | Sengupta ............ G06F 16/2329 |
| 11,163,498 | B2 | 11/2021 | Falco |
| 2002/0035559 | A1 | 3/2002 | Crowe |
| 2002/0042693 | A1 | 4/2002 | Kampe |
| 2002/0078312 | A1 | 6/2002 | Wang-Knop |
| 2003/0120715 | A1 | 6/2003 | Johnson |
| 2003/0135476 | A1 | 7/2003 | Holland |
| 2003/0187927 | A1 | 10/2003 | Winchell |
| 2004/0059805 | A1 | 3/2004 | Dinker |
| 2004/0153558 | A1 | 8/2004 | Gunduc |
| 2004/0153615 | A1 | 8/2004 | Koning |
| 2004/0176968 | A1 | 9/2004 | Syed |
| 2004/0179471 | A1 | 9/2004 | Mekkittikul |
| 2004/0205148 | A1 | 10/2004 | Bae |
| 2004/0267897 | A1 | 12/2004 | Hill |
| 2005/0021690 | A1 | 1/2005 | Peddada |
| 2005/0021737 | A1 | 1/2005 | Ellison |
| 2005/0028139 | A1 | 2/2005 | Togahara |
| 2005/0083834 | A1 | 4/2005 | Dunagan |
| 2005/0160315 | A1 | 7/2005 | Chandrasekaran |
| 2005/0193392 | A1 | 9/2005 | Carusi |
| 2005/0257217 | A1 | 11/2005 | Woollen |
| 2006/0048020 | A1 | 3/2006 | Newport |
| 2006/0179061 | A1 * | 8/2006 | D'Souza ............ G06F 16/283 |
| 2007/0016822 | A1 | 1/2007 | Rao |
| 2007/0118693 | A1 | 5/2007 | Brannon |
| 2007/0124348 | A1 | 5/2007 | Claborn |
| 2007/0140110 | A1 | 6/2007 | Kaler |
| 2007/0174160 | A1 | 7/2007 | Solberg |
| 2007/0198700 | A1 | 8/2007 | Vivian |
| 2007/0237072 | A1 | 10/2007 | Scholl |
| 2007/0271584 | A1 | 11/2007 | Anderson |
| 2008/0077622 | A1 | 3/2008 | Keith |
| 2008/0133531 | A1 | 6/2008 | Baskerville |
| 2008/0141336 | A1 | 6/2008 | Haller |
| 2008/0183876 | A1 | 7/2008 | Duvur |
| 2008/0184201 | A1 | 7/2008 | Burns |
| 2008/0276231 | A1 | 11/2008 | Huang |
| 2008/0281959 | A1 | 11/2008 | Robertson |
| 2008/0313293 | A1 | 12/2008 | Jacobs |
| 2009/0031292 | A1 | 1/2009 | Fulton |
| 2009/0144714 | A1 | 6/2009 | Fan |
| 2009/0177914 | A1 | 7/2009 | Winchell |
| 2009/0228321 | A1 | 9/2009 | Srinivasan |
| 2009/0265449 | A1 | 10/2009 | Krishnappa |
| 2009/0320005 | A1 | 12/2009 | Toub |
| 2010/0064341 | A1 | 3/2010 | Aldera |
| 2010/0128732 | A1 | 5/2010 | Jiang |
| 2010/0174802 | A1 | 7/2010 | Chan |
| 2010/0250321 | A1 | 9/2010 | Farrell |
| 2010/0268571 | A1 | 10/2010 | Davies |
| 2010/0268749 | A1 | 10/2010 | Seitz |
| 2010/0312861 | A1 | 12/2010 | Kolhi |
| 2011/0029930 | A1 * | 2/2011 | Watanabe ............ G06F 8/34 715/846 |
| 2011/0041006 | A1 | 2/2011 | Fowler |
| 2011/0071981 | A1 | 3/2011 | Ghosh |
| 2011/0072217 | A1 | 3/2011 | Hoang |
| 2011/0107135 | A1 | 5/2011 | Andrews |
| 2011/0131663 | A1 | 6/2011 | Kaikuranta |
| 2011/0154090 | A1 * | 6/2011 | Dixon ............ G06F 1/14 713/502 |
| 2011/0161289 | A1 | 6/2011 | Pei |
| 2011/0178997 | A1 | 7/2011 | Johnson |
| 2011/0179231 | A1 | 7/2011 | Roush |
| 2011/0249552 | A1 | 10/2011 | Stokes |
| 2011/0252192 | A1 | 10/2011 | Busch |
| 2012/0011336 | A1 * | 1/2012 | Saika ............ G06F 3/0604 711/162 |
| 2012/0117157 | A1 | 5/2012 | Ristock |
| 2012/0158650 | A1 | 6/2012 | Andre |
| 2012/0191642 | A1 | 7/2012 | George |
| 2012/0198455 | A1 | 8/2012 | Lee |
| 2012/0215740 | A1 | 8/2012 | Vaillant |
| 2012/0254118 | A1 | 10/2012 | Shah |
| 2012/0297056 | A1 | 11/2012 | Lee |
| 2013/0047165 | A1 | 2/2013 | Goetz |
| 2013/0238562 | A1 * | 9/2013 | Kumarasamy ...... G06F 9/45558 707/649 |
| 2014/0149698 | A1 | 5/2014 | Ezra |
| 2014/0215129 | A1 | 7/2014 | Kuzmin |
| 2015/0019493 | A1 * | 1/2015 | Schindler ............ G06F 11/1402 707/649 |
| 2015/0046502 | A1 * | 2/2015 | Pandey ............ G06F 16/289 707/809 |
| 2015/0058293 | A1 | 2/2015 | Kobayashi |
| 2015/0169598 | A1 * | 6/2015 | Lee ............ G06F 9/5027 707/639 |
| 2016/0026703 | A1 * | 1/2016 | Yadav ............ G06F 16/13 707/613 |

(56) References Cited

U.S. PATENT DOCUMENTS

| | | | |
|---|---|---|---|
| 2016/0092540 A1* | 3/2016 | Bihani | G06F 16/256 |
| | | | 707/624 |
| 2016/0246681 A1* | 8/2016 | Tsirkin | G06F 3/0689 |
| 2017/0003900 A1 | 1/2017 | Falco | |
| 2017/0031815 A1* | 2/2017 | Varma | G06F 12/0891 |
| 2018/0314597 A1* | 11/2018 | Zhang | G06F 11/1451 |
| 2019/0370128 A1* | 12/2019 | Sadavarte | G06F 11/0757 |
| 2022/0027052 A1 | 1/2022 | Falco | |

OTHER PUBLICATIONS

European Patent Office, International Searching Authority, International Search Report and Written Opinion dated Jan. 12, 2016 for International Application No. PCT/US2015/052060, 14 pages.

European Patent Office, Examining Division, Communication pursuant to Article 94(3) EPC dated Sep. 4, 2019 for European Patent Application No. 15781206.6, 8 pages.

Jameela Al-Jaroodi et al., "Middleware Infrastructure for Parallel and Distributed Programming Models in Hetergeneous Systems" (2003). CSE Journal Articles, 13 pages, retrieved Jan. 21, 2016 from <http://digitalcommons.unl.edu/cgi/viewcontent.cgi?article=1066&context=csearticles>.

Laurent Baduel et al., "Programming, Composing, Deploying for the Grid", Grid Computing: Software Environments and Tools, Springer, 30 pages, retrieved Jan. 21, 2016 from: <https://hal.inria.fr/inria-00486114/document>.

David Wong et al., "Java-based Mobile Agents", Communications of the ACM, Mar. 1999, vol. 42. No. 3, 11 pages.

United States Patent and Trademark Office, Office Communication dated Sep. 29, 2022 for U.S Appl. No. 17/494,161, 12 pages.

* cited by examiner

SYSTEM AND METHOD FOR PARTITION-SCOPED SNAPSHOT CREATION IN A DISTRIBUTED DATA COMPUTING ENVIRONMENT

CLAIM OF PRIORITY

This application claims the benefit of priority to U.S. Provisional Application No. 62/491,706 filed Apr. 28, 2017 titled "SYSTEM AND METHOD FOR PARTITION-SCOPED SNAPSHOT CREATION IN A DISTRIBUTED DATA COMPUTING ENVIRONMENT" which application is herein incorporated by reference in its entirety

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to a distributed data grid.

SUMMARY

Described herein are systems and methods that can support partition-scoped snapshot creation of caches in a distributed data grid is provided. The system and method enables a snapshot to be created in a running system without quiescing/suspending a cache service. Moreover for each particular partition, execution of write requests is only blocked during the period that a partition-scoped snapshot creation task is being performed for the particular partition. The cache service is not suspended, and continues to execute read/write requests for any partition that is not currently undergoing a snapshot process. The system and method reduces the period of time for which partitions are unavailable during a snapshot process and increases the availability of cache services provided by a distributed data grid compared to prior snapshot systems.

These and other objects and advantages of the present invention will become apparent to those skilled in the art from the following description of the various embodiments, when read in light of the accompanying drawings.

DETAILED DESCRIPTION

Figure 1:
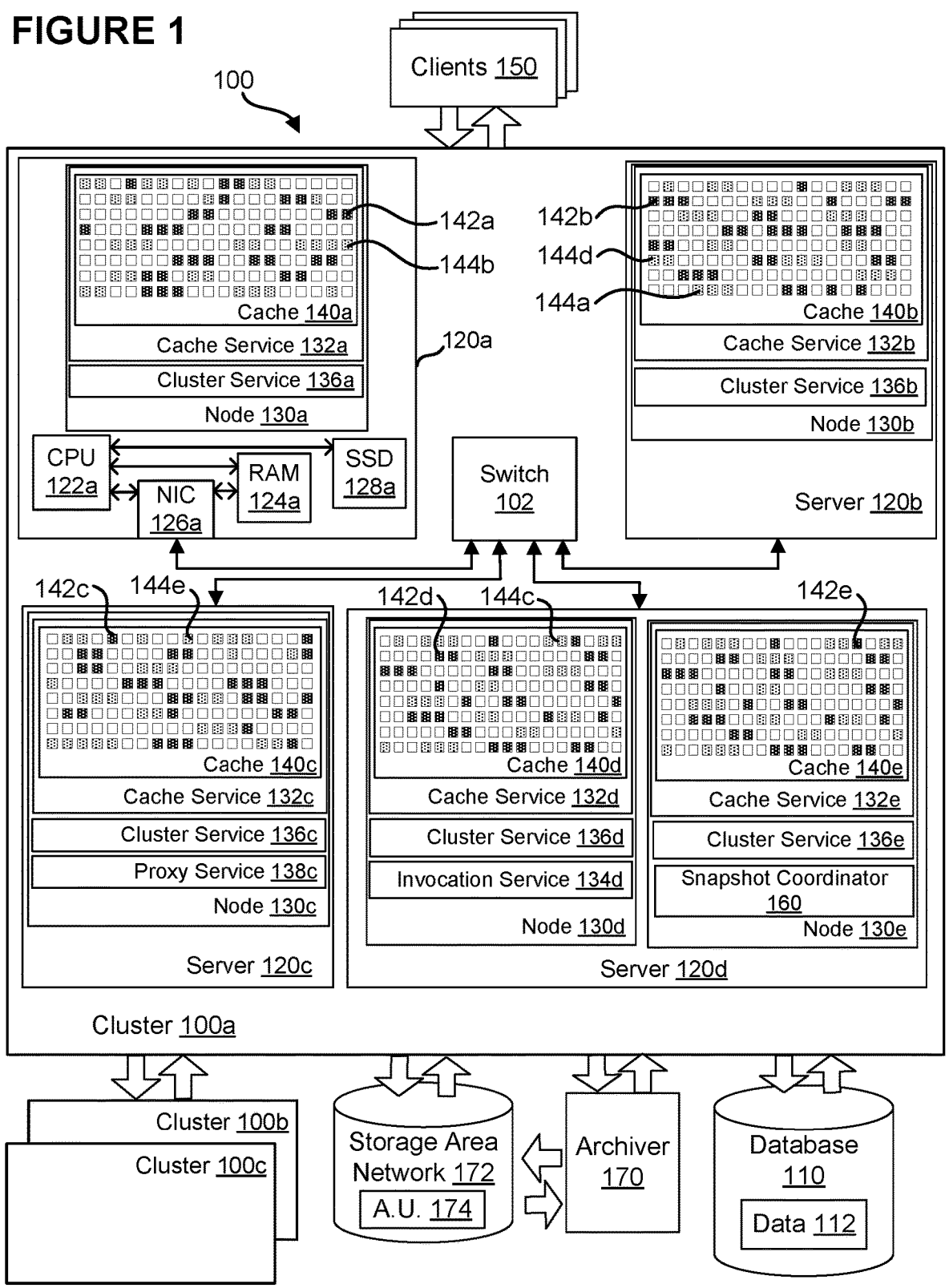
FIG. 1 illustrates a distributed data grid, in accordance with an embodiment of the invention.

Described herein are systems and methods that can support partition-scoped snapshot creation of caches in a distributed data grid. The system and methods for partition-scoped snapshot creation provided for adaptive incremental creation of partition-scoped distributed snapshots. The system and method enables a snapshot to be created in a running system without quiescing a cache service. Moreover for each particular partition, execution of read/write requests is only blocked during the period that a snapshot creation task is being performed for the particular partition. The cache service can therefore continue to execute read/write requests for any partition that is not currently undergoing a snapshot process. The system and method reduces the period of time for which partitions are unavailable during a snapshot process and increases the availability of cache services provided by a distributed data grid compared to prior snapshot systems. The system and methods for providing partitioned snapshot creation as described herein have particular utility in the distributed data grid described below with respect to FIG. 1. The scalable thread pool disclosed herein may also be applied in wide variety of multi-threaded processing environments and applications.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The present invention is described with the aid of functional building blocks illustrating the performance of specified functions and relationships thereof. The boundaries of these functional building blocks have often been arbitrarily defined herein for the convenience of the description. Thus functions shown to be performed by the same elements may in alternative embodiments be performed by different elements. And functions shown to be performed in separate elements may instead be combined into one element. Alternate boundaries can be defined so long as the specified functions and relationships thereof are appropriately performed. Any such alternate boundaries are thus within the scope and spirit of the invention.

Common reference numerals are used to indicate like elements throughout the drawings and detailed description; therefore, reference numerals used in a figure may or may not be referenced in the detailed description specific to such figure if the element is described elsewhere. The first digit in a three digit reference numeral indicates the series of figures in which the element first appears.

Distributed Data Grid

A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability and information reliability. As a result of these capabilities, a distributed data grid is well suited for use in computational intensive, stateful middle-tier applications. In particular examples, distributed data grids, such as e.g., the Oracle® Coherence data grid, store information in-memory to achieve higher performance, and employ redundancy in keeping copies of that information synchronized across multiple servers, thus ensuring resiliency of the system and continued availability of the data in the event of failure of a server.

In the following description, an Oracle® Coherence data grid having a partitioned cache is described. However, one of ordinary skill in the art will understand that the present invention, described for example in the summary above, can be applied to any distributed data grid known in the art without departing from the scope of the invention. Moreover, although numerous specific details of an Oracle® Coherence distributed data grid are described to provide a thorough description of the invention, it will be apparent to those skilled in the art that the invention may be practiced in a distributed data grid without these specific details. Thus, a particular implementation of a distributed data grid embodying the present invention can, in some embodiments, exclude certain features, and/or include different, or modified features than those of the distributed data grid described below, without departing from the scope of the invention.

FIG. 1 illustrates and example of a distributed data grid 100 which stores data and provides data access to clients 150. A "data grid cluster", or "distributed data grid", is a system comprising a plurality of computer servers (e.g., 120a, 120b, 120c, and 120d) which work together in one or more cluster (e.g., 100a, 100b, 100c) to store and manage information and related operations, such as computations, within a distributed or clustered environment. While distributed data grid 100 is illustrated as comprising four servers 120a, 120b, 120c, 120d, with five data nodes 130a, 130b, 130c, 130d, and 130e in a cluster 100a, the distributed data grid 100 may comprise any number of clusters and any number of servers and/or nodes in each cluster. The distributed data grid can store the information in-memory to achieve higher performance, and employ redundancy in keeping copies of that information synchronized across multiple servers, thus ensuring resiliency of the system and continued availability of the data in the event of server failure. In an embodiment, the distributed data grid 100 implements the present invention, described for example in the summary above and the detailed description below.

As illustrated in FIG. 1, a distributed data grid provides data storage and management capabilities by distributing data over a number of servers (e.g., 120a, 120b, 120c, and 120d) working together. Each server of the data grid cluster may be a conventional computer system such as, for example, a "commodity x86" server hardware platform with one to two processor sockets and two to four CPU cores per processor socket. Each server (e.g., 120a, 120b, 120c, and 120d) is configured with one or more CPU, Network Interface Card (NIC), and memory including, for example, a minimum of 4 GB of RAM up to 64 GB of RAM or more. Server 120a is illustrated as having CPU 122a, Memory 124a and NIC 126a (these elements are also present but not shown in the other Servers 120b, 120c, 120d). Optionally each server may also be provided with flash memory—e.g. SSD 128a—to provide spillover storage capacity. When provided the SSD capacity is preferably ten times the size of the RAM. The servers (e.g., 120a, 120b, 120c, 120d) in a data grid cluster 100a are connected using high bandwidth NICs (e.g., PCI-X or PCIe) to a high-performance network switch 120 (for example, gigabit Ethernet or better).

A cluster 100a preferably contains a minimum of four physical servers to avoid the possibility of data loss during a failure, but a typical installation has many more servers Failover and failback are more efficient the more servers that are present in each cluster and the impact of a server failure on a cluster is lessened. To minimize communication time between servers, each data grid cluster is ideally confined to a single switch 102 which provides single hop communication between servers. A cluster may thus be limited by the number of ports on the switch 102. A typical cluster will therefore include between 4 and 96 physical servers.

In most Wide Area Network (WAN) configurations of a distributed data grid 100, each data center in the WAN has independent, but interconnected, data grid clusters (e.g., 100a, 100b, and 100c). A WAN may, for example, include many more clusters than shown in FIG. 1. Additionally, by using interconnected but independent clusters (e.g., 100a, 100b, 100c) and/or locating interconnected, but independent, clusters in data centers that are remote from one another, the distributed data grid can secure data and service to clients 150 against simultaneous loss of all servers in one cluster caused by a natural disaster, fire, flooding, extended power loss and the like. Clusters maintained throughout the enterprise and across geographies constitute an automatic 'backup store' and high availability service for enterprise data.

One or more nodes (e.g., 130a, 130b, 130c, 130d and 130e) operate on each server (e.g., 120a, 120b, 120c, 120d) of a cluster 100a. In a distributed data grid the nodes may be for example, software applications, virtual machines, or the like and the servers may comprise an operating system, hypervisor or the like (not shown) on which the node operates. In an Oracle® Coherence data grid, each node is Java virtual machine (JVM). A number of JVM/nodes may be provided on each server depending on the CPU processing power and memory available on the server. JVM/nodes may be added, started, stopped, and deleted as required by the distributed data grid. JVMs that run Oracle® Coherence automatically join and cluster when started. JVM/nodes that join a cluster are called cluster members or cluster nodes.

In an Oracle® Coherence data grid cluster members communicate using Tangosol Cluster Management Protocol (TCMP). TCMP is an IP-based protocol that is used to discover cluster members, manage the cluster, provision services, and transmit data between cluster members. The TCMP protocol provides fully reliable, in-order delivery of all messages. Since the underlying UDP/IP protocol does not provide for either reliable or in-order delivery, TCMP uses a queued, fully asynchronous ACK and NACK-based mechanism for reliable delivery of messages, with unique integral identity for guaranteed ordering of messages in queues associated with the JVMs operating on a server. The TCMP protocol requires only three UDP/IP sockets (one multicast, two unicast) and six threads per JVM/node, regardless of the cluster size.

The functionality of a data grid cluster is based on services provided by cluster nodes. Each service provided by a cluster node has a specific function. Each cluster node can participate in (be a member of) a number of cluster services, both in terms of providing and consuming the cluster services. Some cluster services are provided by all nodes in the cluster whereas other services are provided by only one or only some of the nodes in a cluster. Each service has a service name that uniquely identifies the service within the data grid cluster, and a service type, which defines what the service can do. There may be multiple named instances of each service type provided by nodes in the data grid cluster (other than the root cluster service). All services preferably provide failover and failback without any data loss.

Each service instance provided by a cluster node typically uses one service thread to provide the specific functionality of the service. For example, a distributed cache service provided by a node is provided by single service thread of the node. When the schema definition for the distributed cache is parsed in the JVM/node, a service thread is instantiated with the name specified in the schema. This service thread manages the data in the cache created using the schema definition. Some services optionally support a thread pool of worker threads that can be configured to provide the service thread with additional processing resources. The service thread cooperates with the worker threads in the thread pool to provide the specific functionality of the service.

In an Oracle® Coherence data grid, the cluster service (e.g., 136a, 136b, 136c, 136d, 136e) keeps track of the membership and services in the cluster. Each cluster node always has exactly one service of this type running. The cluster service is automatically started to enable a cluster node to join the cluster. The cluster service is responsible for the detection of other cluster nodes, for detecting the failure (death) of a cluster node, and for registering the availability of other services in the cluster. The proxy service (e.g., 138c) allows connections (e.g. using TCP) from clients that run outside the cluster. The invocation Service (e.g., 134d) allows application code to invoke agents to perform operations on any node in the cluster, or any group of nodes, or across the entire cluster. Although shown on only one node each, the invocation service and proxy service can be configured on any number up to all of the nodes of the distributed data grid. Agents allows for execution of code/functions on nodes of the distributed data grid (typically the same node as data required for execution of the function is required). Distributed execution of code, such as agents, on the nodes of the cluster allows the distributed data grid to operate as a distributed computing environment.

In an Oracle® Coherence data grid, the distributed cache service (e.g., 132a, 132b, 132c, 132d, 132e) is the service which provides for data storage in the distributed data grid and is operative on all nodes of the cluster that read/write/store cache data, even if the node is storage disabled. The distributed cache service allows cluster nodes to distribute (partition) data across the cluster 100a so that each piece of data in the cache is managed primarily (held) by only one cluster node. The distributed cache service handles storage operation requests such as put, get, etc. The distributed cache service manages distributed caches (e.g., 140a, 140b, 140c, 140d, 140e) defined in a distributed schema definition and partitioned among the nodes of a cluster.

A partition is the basic unit of managed data in the distributed data grid and stored in the distributed caches (e.g., 140a, 140b, 140c, 140d, and 140e). The data is logically divided into primary partitions (e.g., 142a, 142b, 142c, 142d, and 142e), that are distributed across multiple cluster nodes such that exactly one node in the cluster is responsible for each piece of data in the cache. Each cache (e.g., 140a, 140b, 140c, 140d, and 140e) can hold a number of partitions. Each partition (e.g., 142a, 142b, 142c, 142d, 142e) may hold one datum or it may hold many. A partition can be migrated from the cache of one node to the cache of another node when necessary or desirable. For example, when nodes are added to the cluster, the partitions are migrated so that they are distributed among the available nodes including newly added nodes. In a non-replicated distributed data grid there is only one active copy of each partition (the primary partition). However, there is typically also one or more replica/backup copy of each partition (stored on a different server) which is used for failover. Because the data is spread out in partition distributed among the servers of the cluster, the responsibility for managing and providing access to the data is automatically load-balanced across the cluster.

The distributed cache service can be configured so that each piece of data is backed up by one or more other cluster nodes to support failover without any data loss. For example, as shown in FIG. 1, each partition is stored in a primary partition (e.g., dark shaded squares 142a, 142b, 142c, 142d, and 142e) and one or more synchronized backup copy of the partition (e.g., light shaded squares 144a, 144b, 144c, 144d, and 144e). The backup copy of each partition is stored on a separate server/node than the primary partition with which it is synchronized. Failover of a distributed cache service on a node involves promoting the backup copy of the partition to be the primary partition. When a server/node fails, all remaining cluster nodes determine what backup partitions they hold for primary partitions on failed node. The cluster nodes then promote the backup partitions to primary partitions on whatever cluster node they are held (new backup partitions are then created).

A distributed cache is a collection of data objects. Each data object/datum can be, for example, the equivalent of a row of a database table. Each datum is associated with a unique key which identifies the datum. Each partition (e.g., 142a, 142b, 142c, 142d, 142e) may hold one datum or it may hold many and the partitions are distributed among all the nodes of the cluster. In an Oracle® Coherence data grid each key and each datum is stored as a data object serialized in an efficient uncompressed binary encoding called Portable Object Format (POF).

In order to find a particular datum, each node has a map, for example a hash map, which maps keys to partitions. The map is known to all nodes in the cluster and is synchronized and updated across all nodes of the cluster. Each partition has a backing map which maps each key associated with the partition to the corresponding datum stored in the partition. An operation associated with a particular key/datum can be received from a client at any node in the distributed data grid. When the node receives the operation, the node can provide direct access to the value/object associated with the key, if the key is associated with a primary partition on the receiving node. If the key is not associated with a primary partition on the receiving node, the node can direct the operation directly to the node holding the primary partition associated with the key (in one hop). Thus, using the hash map and the partition maps, each node can provide direct or one-hop access to every datum corresponding to every key in the distributed cache.

In some applications, data in the distributed cache is initially populated from a database 110 comprising data 112. The data 112 in database 110 is serialized, partitioned and distributed among the nodes of the distributed data grid. Distributed data grid 100 stores data objects created from data 112 from database 110 in partitions in the memory of servers 120a, 120b, 120c, 120d such that clients 150 and/or applications in data grid 100 can access those data objects directly from memory. Reading from and writing to the data objects in the distributed data grid 100 is much faster and allows more simultaneous connections than could be achieved using the database 110 directly. In-memory replication of data and guaranteed data consistency make the distributed data grid suitable for managing transactions in memory until they are persisted to an external data source such as database 110 for archiving and reporting. If changes are made to the data objects in memory the changes are synchronized between primary and backup partitions and may subsequently be written back to database 110 using asynchronous writes (write behind) to avoid bottlenecks.

Although the data is spread out across cluster nodes, a client 150 can connect to any cluster node and retrieve any datum. This is called location transparency, which means that the developer does not have to code based on the topology of the cache. In some embodiments, a client might connect to a particular service e.g., a proxy service on a particular node. In other embodiments, a connection pool or load balancer may be used to direct a client to a particular node and ensure that client connections are distributed over some or all the data nodes. However connected, a receiving node in the distributed data grid receives tasks from a client 150, and each task is associated with a particular datum, and must therefore be handled by a particular node. Whichever node receives a task (e.g. a call directed to the cache service) for a particular datum identifies the partition in which the datum is stored and the node responsible for that partition, the receiving node, then directs the task to the node holding the requested partition for example by making a remote cache call. Since each piece of data is managed by only one cluster node, an access over the network is only a "single hop" operation. This type of access is extremely scalable, since it can use point-to-point communication and thus take optimal advantage of a switched fabric network such as InfiniBand.

Similarly, a cache update operation can use the same single-hop point-to-point approach with the data being sent both to the node with the primary partition and the node with the backup copy of the partition. Modifications to the cache are not considered complete until all backups have acknowledged receipt, which guarantees that data consistency is maintained, and that no data is lost if a cluster node were to unexpectedly fail during a write operation. The distributed cache service also allows certain cluster nodes to be configured to store data, and others to be configured to not store data.

In some embodiments, a distributed data grid is optionally configured with an elastic data feature which makes use of solid state devices (e.g. SSD 128a), most typically flash drives, to provide spillover capacity for a cache. Using the elastic data feature a cache is specified to use a backing map based on a RAM or DISK journal. Journals provide a mechanism for storing object state changes. Each datum/value is recorded with reference to a specific key and in-memory trees are used to store a pointer to the datum (a tiny datum/value may be stored directly in the tree). This allows some values (data) to be stored in solid state devices (e.g. SSD 128a) while having the index/memory tree stored in memory (e.g. RAM 124a). The elastic data feature allows the distributed data grid to support larger amounts of data per node with little loss in performance compared to completely RAM-based solutions.

A distributed data grid such as the Oracle® Coherence data grid described above can improve system performance by solving data operation latency problems and by caching and processing data in real time. Applications cache data in the data grid, avoiding expensive requests to back-end data sources. The shared data cache provides a single, consistent view of cached data. Reading from the cache is faster than querying back-end data sources and scales naturally with the application tier. In memory performance alleviates bottlenecks and reduces data contention, improving application responsiveness. Parallel query and computation is supported to improve performance for data-based calculations. The distributed data grid is fault-tolerant, providing for data reliability, accuracy, consistency, high availability, and disaster recovery. The distributed data grid enables applications to scale linearly and dynamically for predictable cost and improved resource utilization. For many applications, a distributed data grid offers a valuable shared data source solution.

In embodiments of the present invention, the distributed data grid 100 of FIG. 1 implements one or more system and method for persistence of the data within the caches 140a, 140b, 140c, 140d, and 140e. Persistence features of the distributed data grid manage the persistence and recovery of distributed caches. Cached data is persisted so that it can be quickly recovered after a catastrophic failure or after a cluster restart due to planned maintenance. Enabling on-demand persistence, a cache service is manually persisted and recovered upon request using the snapshot coordinator 160. The snapshot coordinator 160 provides operations for creating, archiving, and recovering snapshots of a cache service. A persistence policy may also be used to schedule persistence at predetermined intervals, times or upon the occurrence of defined events.

Persistence uses a persistence store to store copies of the backing map of partitions of a partitioned service. The persistence files can be stored on the local disk (e.g. SSD 128a of each server or on a shared disk on a storage area network (SAN) 162 or in a database 110. The local disk option allows each cluster member to access persisted data for the service partitions that it owns. Local disk storage provides a high throughput and low latency storage mechanism. The shared disk option allows each cluster member to access persisted data for all service partitions. Both the local disk and shared disk approach can rely on a quorum policy that controls how many cluster members must be present to perform persistence operations and before recovery can begin. Quorum policies allow time for a cluster to start before data recovery begins.

Each cache service (e.g. 132a, 132b, 132c, 132d, and 132e) is operated on a single cache service thread operating on a cluster member (the service thread may utilize a pool of worker threads). In prior persistence mechanisms, operation of the cache service threads was suspended during creation of a snapshot of all the partitions served by the cache service thread. Consequently, all partitions under control of the cache service thread were unavailable for read or write requests during the persistence of the entire contents of the cache served by the cache service thread. The cache service thread was only reactivated after completion of the snapshot. Suspending the cache service thread is disadvantageous because it reduces the availability of data in the caches.

Partition-Scoped Snapshot Creation

In some situations, it may be necessary or desirable to make a persistent snapshot of a data grid cluster. A distributed data grid can support various cache services using an in-memory data store. The system allows a user to use a management tool to take a snapshot of the in-memory data store that supports the cache services on-demand, at any particular time. In prior systems cache services were suspended across the cluster, prior to taking the snapshot of the cluster. Thus, the system provided a globally consistent point in time for taking the snapshot, i.e. all partitions were copied at the same point in time with no deviations because all read and write operations were suspended during creation of the snapshot. Then, the cache service was resumed after the snapshot was completed. The snapshot provided a globally consistent view of the entire cache service. For example, the snapshot provided a catalogue of all state information of the system at a particular point in time, including metadata and cache data for the cache services. Additionally, the system could store/persist the snapshot either in a central location such as a storage area network or in distributed local disks. See, e.g. U.S. patent application Ser. No. 14/271,161 titled "SYSTEM AND METHOD FOR PROVIDING A PERSISTENT SNAPSHOT OF A RUNNING SYSTEM IN A DISTRIBUTED DATA GRID" filed May 6, 2014 which is incorporated herein by reference.

However, because snapshots are made, maintained and restored on a partition by partition basis, it is not essential to make all of the snapshots of all of the individual partitions at the same point in time. To achieve scalable transactions in a distributed data architecture, affinity or pinning processes ensure that any related data is stored in the same partition thus can be atomically updated. To put it another way, data in different partitions is generally independent of data in other partitions. Accordingly, it is unnecessary to have all snapshots of partitions made at the same point in time to provide a globally consistent view of the whole cluster. Inter-partition synchronization is not important and the need to quiesce/suspend all cache services in order to achieve inter-partition synchronization has substantial costs in terms of service unavailability.

In embodiments of the present invention, snapshots are created under control of the snapshot coordinator 160 with partition-scoped atomicity. That is, snapshots are created a partition-at-a time rather than all at the same point in time. This feature allows cache service threads to remain running while a persistent snapshot of the distributed data grid is created. Accordingly, the cache service threads need not be suspended during the partition-scoped snapshot process. Rather than deactivating cache service threads for all partitions during creation of a snapshot, the partition-scoped snapshot process effectively blocks processing of persistent tasks on a particular partition during creation of a snapshot (copying of the backing map to the designated store) on that particular partition and then releases the block after the snapshot has been created. The partitioned snapshot process iterates over all the partitions in each node of the cluster in order to obtain snapshots of all the partitions.

This partition-by-partition process allows all partitions which are not in the process of being copied/persisted to continue responding to read and write requests via the still running cache service. Moreover for each particular partition, execution of write requests is only blocked during the period that a partition-scoped snapshot creation task is being performed for the particular partition and execution of read-only requests can continue even during snapshot creation. Consequently use of the partition-scoped snapshot process described herein increases the availability of data in the cache service compared to the prior snapshot systems and methods. Accordingly, the partitioned snapshot creation system and method improves the performance of a distributed data grid by avoiding the need to suspend cache service threads during snapshots and increasing the availability of data to users of the system via clients 150.

Referring again to FIG. 1, when partition-scoped snapshot creation is triggered, Snapshot Coordinator 160 sends snapshot requests to each node in the cluster. The snapshot requests have partition-scoped atomicity. To put it another way an individual request is sent from the snapshot coordinator to each node identifying each primary partition on the node for which a snapshot is desired. Each request specifies the task or persisting the identified primary partitions for which it is issued and includes a timeout period. If particular partition-scoped snapshots are not completed within the timeout period the request fails and an error message is returned to the snapshot coordinator. The snapshot coordinator 160 retries with a new partition-scoped snapshot request for any partitions where the original request failed until all partition-scoped snapshots have been prepared for every partition in the cluster (or the desired subset of all partitions).

The snapshot process staggers partition-scoped snapshot creation such that it is performed iteratively—partition-by-partition for each cluster member in the service. Staggering of the partition-scoped snapshot requests can be used to control the amount of resources being used for snapshot creation at any point in time. For example, the snapshot coordinator will send a snapshot request to each member requesting the creation of a snapshot for all of the partitions it owns. The node receiving the request will iterate over each partition creating a snapshot of each partition it owns, and respond to the coordinator with the identity of partitions that succeeded and the elapsed times to create the snapshots. The coordinator will subsequently request for any failed partitions to be snapshot and maintain statistics for the elapsed times. These statistics are used in future partition-scoped snapshot requests to reduce the number of members contacted in an iteration thus reduce the observability of the request. Ultimately the algorithms purpose is to determine an ideal compromise between availability and total request time.

When a partition-scoped snapshot request is received at a cluster member/node, the cluster member performs partition-scoped snapshot tasks sequentially for all of the partitions identified in the request. Before each partition-scoped snapshot task, the cluster member/node must first process all pending (received before the partition-scoped snapshot request) transaction requests directed at the identified partition. After draining the pending transaction requests, the cluster member processes the partition-scoped snapshot request by persisting a copy of the identified partition to the designated persistence store (either the local disk or shared disk). Upon completion of each partition-scoped snapshot task, the cluster member either proceeds to the next identified partition, or sends a response to the cluster coordinator (if no partitions remain). If the snapshot is not created the cluster member sends a response to the cluster coordinator indicating fail. The response includes the successful partitions, failed partitions and latencies. If a particular snapshot of a partition times out or otherwise fails, the snapshot coordinator sends another partition-scoped snapshot request for the partition at a later time.

During the making of the copy of the partition, the cache service thread is not suspended. Additional transaction requests directed at the identified partition may be received during the copying process. In order to ensure intra-partition consistency, no persistent transaction requests directed at the identified partition (e.gg. write operations) are allowed to proceed during creation of the snapshot of the partition. Processing of persistent tasks directed to the identified partition is therefore deferred until after completion of the snapshot for the identified partition. However, processing of persistent transactions on the identified partition is resumed as soon as the snapshot is completed. Moreover, transactions directed at other partitions served by the cache service thread and non-persistent transactions directed at the partition being snapshot (can continue to be processed. Thus, the remainder of cache remains available for transactions during the snapshot of the identified partition. The duration of unavailability of each partition is therefore substantially reduced as compared to systems which suspend the cache service threads through a cluster during the entire snapshot process for all partitions. In general terms, read availability of cache data is not interrupted and write availability is only interrupted during executions of the snapshot task for the particular partition in which the data is stored.

In some embodiments, the partition-scoped snapshots are persisted initially to the local disk on the node holding the partition. Subsequently an archiver 170 (see FIG. 1) copies the partition-scoped snapshots from the local disks on the nodes to a central location e.g. Storage area network 172. The partition-scoped snapshots may then be compiled into a single archive unit and the single archive unit 174 persisted at the central location. An archiver suitable for use in conjunction with the partition-scoped snapshot creation is described in U.S. patent application Ser. No. 15/200,887 entitled "SYSTEM AND METHOD FOR DISTRIBUTED PERSISTENT STORE ARCHIVAL AND RETRIEVAL IN A DISTRIBUTED COMPUTING ENVIRONMENT" filed on Jul. 1, 2016.

Figure 2:
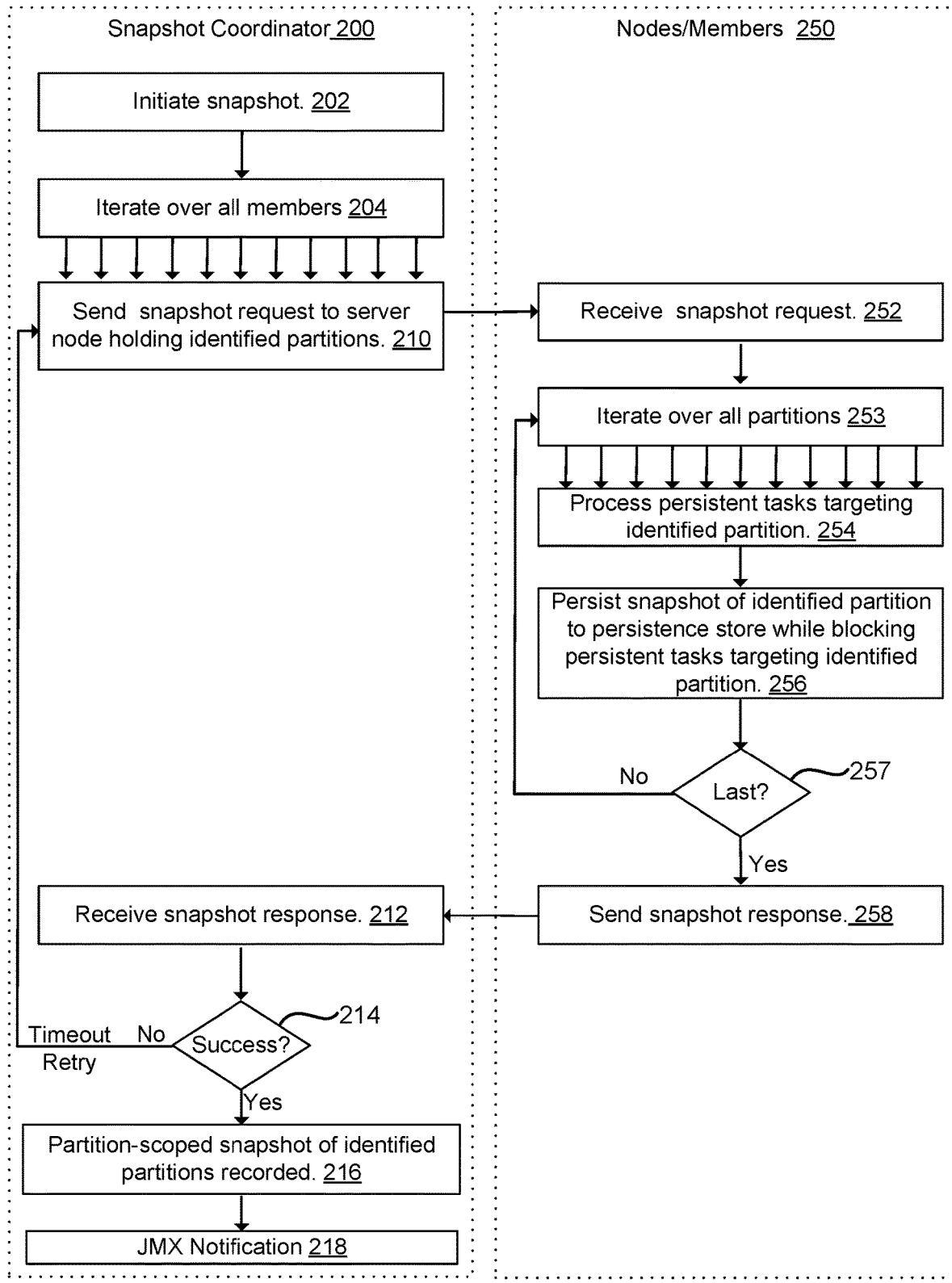
FIG. 2 illustrates a method for partitioned snapshot creation in a distributed data grid, in accordance with an embodiment of the invention.

FIG. 2 illustrates a method for partition-scoped snapshot creation in a distributed data grid, in accordance with an embodiment of the invention. The left column shows actions of Snapshot Coordinator 200. The right column shows the actions of Nodes 250 with respect to each partition-scoped snapshot request. As shown in FIG. 2, at step 202, the snapshot coordinator initiates partition-scoped snapshot creation at step 202. The initiation can be based on user request or a policy or a schedule.

At step 204, the snapshot coordinator iterates snapshot requests over all the members/nodes for which partition-scoped snapshots are required. Typically the snapshot process will include all partitions in a cluster. In an alternative embodiment, for example in a multi-tenant distributed data grid, a subset of including less than all partitions in the cluster will be selected. For example the partition-scoped snapshot creation may be limited to only those partitions owned by a particular tenant. Whether some or all of the partitions are selected, the snapshot coordinator sends a different snapshot request to each member/node identifying the partitions owned by the node for which partition-scoped snapshots are to be created.

Multiple snapshot requests can be in process on different servers/nodes simultaneously. However it is preferable that snapshot creation does not consume all available threads/processing power on the servers/nodes because that would impair performance of other services. Thus, initiation of the partition-scoped snapshot creation may be staggered to control the amount of resources being used for snapshot creation at any point in time. For example, snapshot coordinator may send only one or two snapshot requests at a time. In such case, new snapshot requests (for other server/node) are only transmitted after a response is returned from the particular server node (success or fail). Alternatively, the snapshot coordinator may transmit snapshot requests to nodes at particular time intervals selected to permit completion of the prior partition-scoped snapshot request.

Referring again to FIG. 2, steps 210-216 show the process performed by the snapshot coordinator for each partition-scoped snapshot. This process is repeated for each of the cluster members. At step 210, the snapshot coordinator sends a snapshot request identifying particular partitions to the server node holding the particular partitions. The request includes a snapshot name and a set of partitions for which snapshots art to be made. Each snapshot process is created with a unique name which is exposed via the snapshot coordinator. This unique name allows future operations on the collection of partition-scoped snapshots created in the same snapshot process to occur including recover from snapshot and archive/retrieve snapshot. The individual partition-scoped snapshots can be identified for recovery by the unique snapshot name and the partition identifier/key.

At step 212, the snapshot coordinator receives a partition-scoped snapshot response from the server node holding the particular partition. The response includes the successful partitions, failed partitions and latencies. The response indicates success or failure for the task of persisting a copy of the particular partitions identified in the request to the designated persistence store. At step 214 if the partition-scoped snapshot creation was not successful with respect to one or more partitions, the snapshot coordinator retries the process starting at step 210, such retry may be immediate or after a period of time. The snapshot coordinator can use the latency information from the snapshot response to inform when to retry a snapshot or to adjust future snapshot processes. At step 214, the snapshot coordinator can retry snapshots of failed partitions by sending new snapshot requests directed at the failed partitions. At step 216 if the partition-scoped snapshot creation was successful or a partition failed the snapshot by exceeding a threshold, the snapshot coordinator records the successful and failed partitions and emits a JMX Notification at step 218 to ensure any subscribers are aware of the result of the request.

Referring again to FIG. 2, steps 252-258 show the process performed by the nodes for each snapshot request and partition-scoped snapshot task. This process is repeated by each of the nodes for each of the partitions held by the nodes. At step 252, the node receives a partition-scoped snapshot request identifying particular partitions from the snapshot coordinator. A timeout period is applied to the request such that the request fails if not performed within the timeout period. The request includes a snapshot name and a set of partitions for which snapshots art to be made. For each identified partition the node performs the task of persisting a copy of the particular partition to the designated persistence store.

The request is processed on the cache service thread and then individual partition-scoped snapshot tasks are dispatched sequentially for execution (e.g. to an association pile as described below). A timeout period is applied to each partition-scoped snapshot task such that the task fails if not performed within the timeout period. The task comprises persisting a copy of the particular partition to the designated persistence store. Thus the node iterates the snapshot tasks over all partitions identified in the snapshot request.

Prior to performing a snapshot task for a particular partition, at step 254, the node drains any pending persistent tasks targeting the identified partition. Then at step 256, the node performs the task of persisting a copy of the particular partition to the designated persistence store. During the persisting step, the node does not suspend the cache service and continues to process requests against partitions not in the persisting step. However during the persisting step, the node blocks persistent tasks targeting the particular partition undergoing the persisting step. This is to ensure that no changes are made to the particular partition during the persisting step. The blocking of persistent tasks (e.g. write operations) received after the partition-scoped snapshot request is underway can be achieved in a number of ways. One way is for the persisting process to obtain a lock on the partition to prevent other requests from accessing the partition. Another way is through use of the association pile described below. Blocking, as used herein, means preventing the processing of other persistent tasks against the particular partition, however it is achieved, whether through locking the partition, utilization of an association pile, or by other means. After completion of each snapshot task the node may then resume processing persistent tasks targeting the particular partition, including any persistent tasks which accumulated during the snapshot persisting step.

When a particular individual partition-scoped snapshot task has been executed it finalizes the task on the service thread which proceeds at step 257 to snapshot the next partition or respond to the snapshot coordinator if no partitions remain. Accordingly on a particular node the snapshot tasks are staggered (performed sequentially) to prevent saturating all of the available worker threads with the snapshot process and impairing performance of other tasks by the cache service. Upon completion of the task of persisting copies of all the partitions identified in the snapshot request to the designated persistence store (or timeout or failure), at step 258 the node sends a snapshot response to the snapshot coordinator. The response includes the successful partitions, failed partitions and latencies. The response indicates success or failure for the task of persisting a copy of the particular partitions identified in the request to the designated persistence store and durations of the snapshot tasks.

At step 216 if the partition-scoped snapshot creation was successful or a partition failed the snapshot by exceeding a threshold, the snapshot coordinator records the successful and failed partitions and emits a JMX Notification at step 218 to ensure any subscribers are aware of the result of the request. As described above, upon completion of the partition-scoped snapshot creation for each of the partitions, an optional archiver can perform an archive process to copy all the partition-scoped snapshot to a central location for compilation into a single archive unit.

Partitioned Snapshot Creation Utilizing An Association Pile

In an embodiment, the partitioned snapshot system and method is implemented for cache service threads utilizing an association pile having a scalable thread pool of worker threads. The scalable thread pool provides the cache service thread with additional processing resources and a system. In particular, the scalable thread pool exhibits high performance on multi-core systems and is suitable for providing a cache service thread of a distributed data grid with additional worker threads when required thereby improving performance of the distributed data grid. A data structure for providing work to worker threads comprises work slots and association piles which reduce and/or eliminate contention while allowing scaling of the thread pool. The scalable thread pool as described has particular utility to cache service threads in the distributed data grid described below with respect to FIG. 1. Additional features of the scalable thread pool are described in U.S. patent application Ser. No. 14/857,458 entitled SYSTEM AND METHOD FOR SUPPORTING A SCALABLE THREAD POOL IN A DISTRIBUTED DATA GRID FILED Sep. 17, 2015 which is hereby incorporated by reference.

The scalable thread pool can be used to implement the partition-scoped snapshot creation on the server nodes. The snapshot coordinator can send requests with partition-scoped atomicity to nodes requesting they make snapshots (copies) of identified partitions. The cache service which receives the requests then iterates a snapshot process over the identified partitions generating partition-scoped snapshot tasks for each identified partition. The partitions-scoped snapshot tasks are dispatched to the scalable thread pool for execution. All tasks that involve writing to the persistent store for a particular partition (persistent tasks) are effectively single-threaded through an association pile. The snapshot task for a particular partition is added to the back of an association pile through which all persistent tasks targeting the partition are directed.

For the purposed of this embodiment a cache service write request can be broken down into two sections; processing the primary storage, persisting to the recoverable store and responding to the sender of the request. The persisting to the recoverable store is a separate task added to the association pile with the same association as any other persistent tasks for a particular partition, including the snapshot task. The write request only responds to the sender upon completion of the 'persisting to recoverable store' section of the request. This segmented hand-off of associated work introduces some novel traits; for this scenario it allows the snapshot task to execute with exclusive access to the persistent store but allows read and write cache service requests to complete. Read requests will execute without being impeded. However write requests that are processed for the same partition after the snapshot task was added to the pile will wait for completion of the snapshot task before the write request task can complete and the sender of the request be responded to.

When all prior received persistent tasks directed to the particular partition have been processed, the partition-scoped snapshot created task is polled from the association pile to begin processing of the snapshot persisting task. The association pile only allows one persistent task related to a particular partition to be polled at a time. Thus, the snapshot task runs on the only worker thread processing persistent tasks related to the partition at the time (thereby preventing any other persistent tasks operating on partition until complete). This blocks processing of any other persistent tasks directed to the particular partition without the need for an explicit lock on the partition. Persistent tasks directed at the partition can still be added to association pile during execution of the snapshot task. However they won't be polled from the association pile until the snapshot task is completed and the worker thread is released. Non persistent tasks (e.g. read requests) can still be performed by the cache service. Thus there is no need to suspend the cache service thread during snapshotting. When the worker thread finishes snapshot task, it is released and it can move on to other tasks queued in the association pile. Thus, cache service availability is improved relative to prior systems which required quiescing the cache service during snapshot creation.

Figure 3:
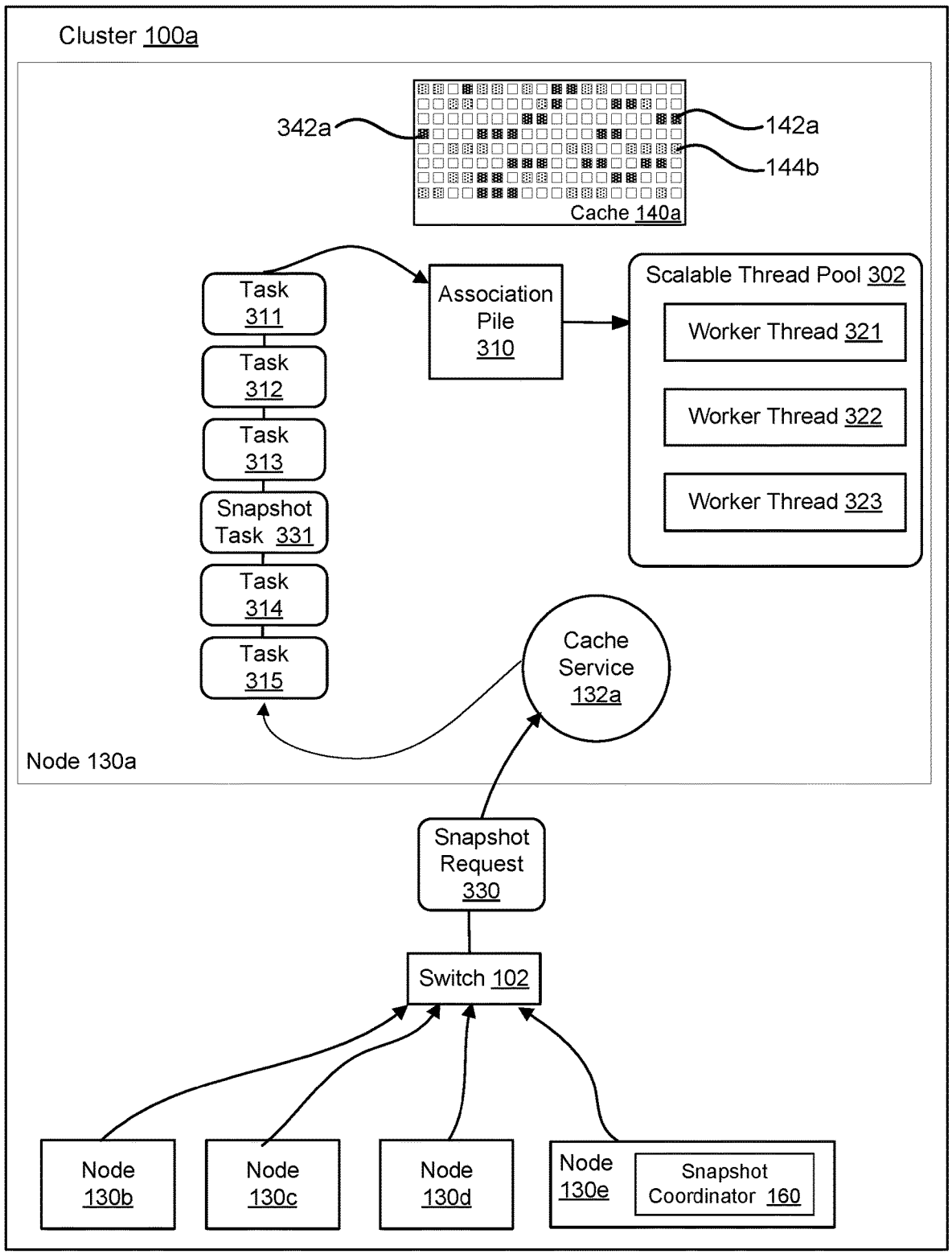
FIG. 3 illustrates an implementation of the system and method for partitioned snapshot creation using an association pile in accordance with an embodiment of the invention.

FIG. 3 shows an overview of a scalable thread pool system suitable for use in a distributed data grid. The scalable thread pool system can be configured to implement functionality of the partition-scoped snapshot system and method. As shown in FIG. 3, a cache service thread 132*a* operating on a node 130*a* in the cluster 100*a* of the distributed data grid can receive requests from any of the other nodes in the cluster (e.g. nodes 130*b*, 130*c*, 130*d*, and 130*e*). The requests are directed for execution against particular partitions in the cache 140*a*. In embodiments of the present invention the cache service thread 132*a* can also receive snapshot requests from the snapshot coordinator 160 e.g. Snapshot request 330. Each snapshot request provides for copying the backing map associated with one or more identified partitions to the designated persistence store.

The cache service thread 132*a* processes messages, including snapshot request 330 in the order in which they are received by the cache service thread 132*a*. In response to the messages the cache service generates tasks (e.g. tasks 311-315) which are added to the association pile for execution.

Additionally, in response to the snapshot request 330, the cache service may generate a snapshot task 331 for creating a snapshot of partition 142b. The scalable thread pool 302 contains one or typically more worker threads 321-323. The association pile 310 holds one or more elements (e.g. the tasks 311-315 and snapshot task 331). Furthermore, the system allows multiple threads (e.g. the worker threads 321-323) to poll elements from the association pile 310 in parallel. Additionally, the system prevents an element, which is held in the association pile 310 and has an association with a previously polled element, from being polled until the previously polled associated element has been released. Persistent tasks directed to the same partition have the same association. Thus, the system can prevent a persistent task in the association pile keyed to a particular partition from being processed while another persistent task keyed to the same partition is being executed by a worker thread.

An association pile, such as association pile 310, is a data structure that holds elements in a loosely ordered way with a queue-like contract. The association pile respects the possibility that some elements can be associated with one another by way of an associated key. Elements associated with the same key should maintain first-in-first-out (FIFO) ordering, but may be re-ordered with respect to elements associated with different keys. The key may be, for example, the unique key which identifies a partition (e.g. partition 142a) in the distributed data grid as described above. Only one thread can operate on persistent tasks for a particular partition at a time and persistent operations performed on a particular partition should be performed in the order they are received. This is because all persistent tasks for a partition have the same association and thus can only be polled sequentially upon completion of the preceding task. Accordingly an association pile can, for an example, maintain first-in-first-out (FIFO) ordering of persistent operations performed on a particular partition associated with a same unique key.

Elements can be added to and removed from an association pile. Elements are added to the association pile by a calling thread (e.g. cache service thread 132a). Elements are removed from an association pile by a worker thread (e.g. 321, 322, and 323). Removing an element is performed in two steps: first an available element is removed by a worker thread "polling" the association pile; second when the worker thread is finished with the element it is "released" from the association pile. The association pile 310 assumes that polled—but not-yet-released elements are being processed on a worker thread and therefore prevents polling of any element associated with the same key as a polled—but not-yet-released element. Thus, the system can prevent a persistent task in the association pile keyed to a particular partition from being processed while another persistent task keyed to the same partition is pending.

Accordingly, using the association pile, elements in the association pile directed to the same partition in cache 140a are processed in the order they are received. When Snapshot Request Task 331 for partition 142a is placed in the association pile 310, it will be maintained in first-in-first-out (FIFO) ordering with respect to other persistent tasks directed at partition 142a. Moreover the association pile ensures that only one persistent task directed at partition 142a is polled and executed by a worker thread at time. Accordingly, if there are pending persistent tasks directed to partition 142a they will be processed and completed in order of receipt until the Snapshot Task 3331 is passed to the worker thread. Accordingly the association pile ensures that all persistent tasks directed to partition 142a are drained/completed before commencing the persisting task specified by the snapshot task 331. If, for example tasks 311, 312, 314 are persistent tasks directed to partition 142a they will be executed and completed before snapshot task 331.

The worker thread will then perform the persisting task specified by the snapshot task 331 by copying the backing map of the partition 142a to the designated persistence store for creating the snapshot of partition 142a. During the data transfer, additional persistent tasks directed at partition 142a (and thus having the same association key) will accumulate in the association pile 310. If, for example messages 314, 315 are persistent tasks directed to partition 142a they will accumulate in the association pile 310 but not be completed prior to the release of the snapshot persisting task 331.

Because processing is essentially single-threaded (only one persistent task directed at a partition can be polled at a time) with respect to partition 142a, no completion of the other persistent tasks for partition 142a will occur during the partition-scoped snapshot process. This effectively blocks write access to partition 142a ensuring the snapshot of the partition 142a is consistent (no data changed during the snapshot) without necessitating placing a lock on the partition 142a (using e.g. compare-and-set CAS). Moreover cache service processing of persistent tasks with respect to the particular partition 142a is effectively blocked (write requests are added to the association pile) without requiring suspending operation of the cache service thread 132a as to the particular partition (or any other partition). Thus, if for example messages 314, 315 are directed to different partition 342a they can be placed by cache service thread 132a into the association pile 310 and may be processed on a different worker thread even during performance of the persisting task with respect to partition 142a. Moreover non-persistent (e.g. read only) tasks directed to partition 142a can be processed in parallel on other threads even during the snapshot task for partition 142a.

Figure 4A:
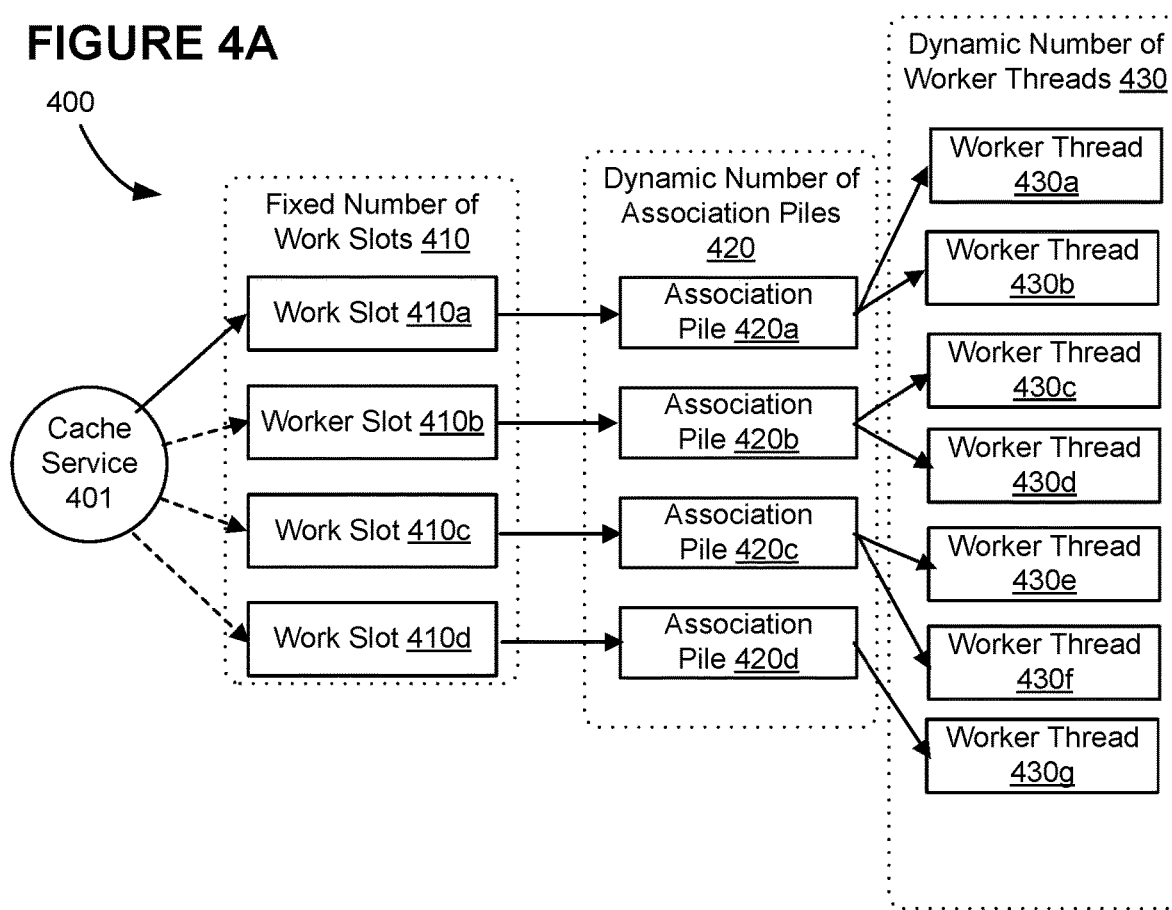
FIGS. 4A and 4B illustrate an implementation of the system and method for partitioned snapshot creation using a scalable association pile in accordance with an embodiment of the invention.
Figure 4B:
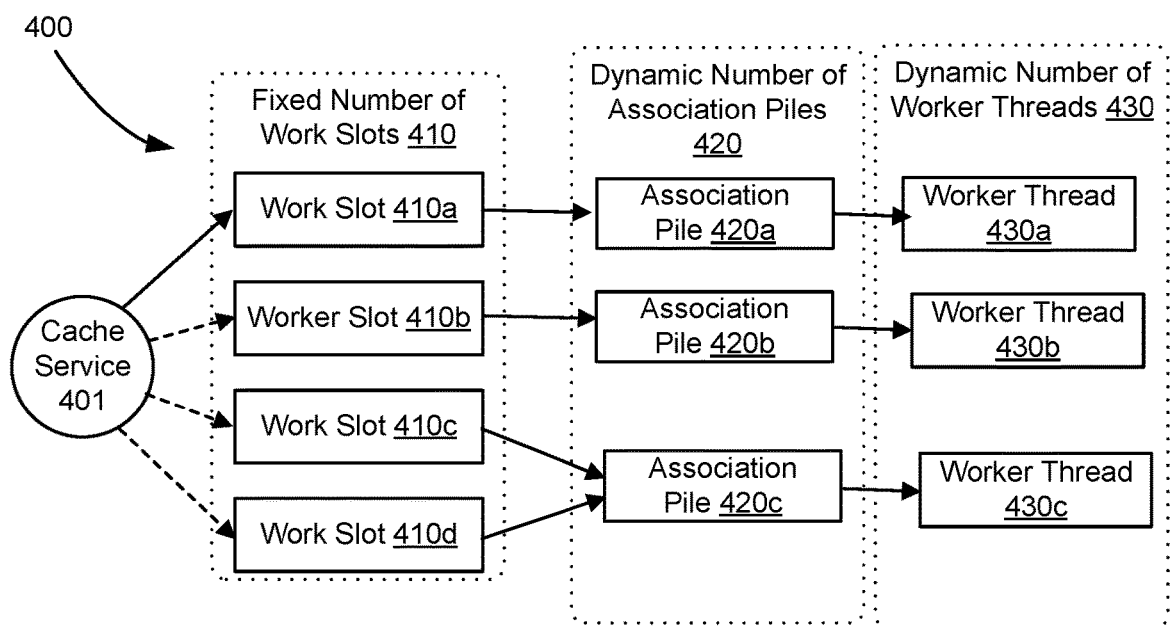

FIGS. 4A and 4B show a more detailed example of a cache service thread 401 utilizing association piles and a scalable thread pool. As shown in FIGS. 4A and 4B, a cache service thread 401 is associated with a scalable thread pool 400. Thread pool 400 has of a fixed number (CPU count) of work slots 410. Four work slots 410a, 410b, 410c, and 410d are shown. Each work slot has a thread gate which can either be open or closed. When the thread gate is open a thread can enter and exit the gate. When a thread has entered a gate, the gate cannot be closed. When the thread gate is closed threads cannot enter the gate.

When work is added to the thread pool by the service thread, the work is distributed across the work slots. The service thread adds the work to the slot 410a, 410b, 410c, or 410d with the smallest backlog (i.e. the slot with the smallest association pile) with some randomness. However all work associated with the same key is added to the same slot in order to preserve ordering of associated work. Accordingly all work associated with a same partition goes to the same one of the work slots. When work is added to a work slot of a thread pool, the calling thread enters the thread gate of the work slot and adds the work to an association pile as described below.

A thread pool's fixed number (CPU count) of work slots are linked to one or more worker threads by way of one or more association pile. The thread pool has a dynamic number of association piles 420. Each work slot is associated with exactly one association pile. However multiple work slots may share the same association pile. When work is added to a work slot of the thread pool, the calling thread enters the thread gate of the work slot and adds the work to one of the association piles. All work added through a particular work slot is directed to the particular association pile associated with that work slot. All work related to a particular key (e.g. a particular partition) is added through the same work slot and, thus, is directed to the same association pile. Thus all work related to a particular partition is directed to the same association pile.

A thread pool also has a dynamic number of worker threads 430. Each worker thread is associated with exactly one association pile. The worker threads poll work form the association piles. But, each worker thread only polls work from the one association pile with which the worker thread is associated. Multiple worker threads can be associated with the same association pile and poll work from it. As shown in FIGS. 4A and 4B, the number of worker threads and the number of association piles in the scalable thread pool can change over time as worker threads are added or removed according to the methods described with respect to FIGS. 4A, 4B, 5, 6.

FIG. 4A shows a configuration where the number of worker threads 430 is greater than the number of work slots 412. When there are more worker threads than work slots, the number of association piles equals the number of work slots. In the configuration of FIG. 4A there are seven active worker threads 430a, 430b, 430c, 430d, 430e, 430f, and 430g. Thus, as shown in FIG. 4A, because there are four work slots 410a, 410b, 410c, and 410d there are also four association piles 420a, 420b, 420c, and 420d. As shown in FIG. 4A, each work slot has a dedicated association pile into which a calling thread which enters the slot places work. All work related to a particular key (e.g. a same association) is added through the same work slot and, thus, is directed to the same dedicated association pile. There are more worker threads than piles, therefore at least some of the worker threads 430a, 430b, 430c, 430d, 430e, 430f, and 430g need to share some of the association piles. That is to say more than one worker thread can be removing work from each association pile.

For example, worker threads 430a and 430b both poll work from association pile 420a. Elements are removed from an association pile by a worker thread. Removing an element is performed in two steps: first an available element is removed by a worker thread "polling" the association pile; second when the worker thread is finished with the element it is "released" from the association pile. The association pile assumes that polled—but not-yet-released elements are being processed and therefore prevents polling of any element associated with the same key as a polled—but not-yet-released element. This ensures, for example, that only a single worker thread is utilized at a time for processing persistent tasks with respect to a particular partition associated with a particular key and thus ensures only a single persistent task at a time can be processed with respect to a partition at a time. Thus although two worker threads are available for performing work in the association pile only one thread can be performing persistent tasks for a particular partition at a time. This results essentially in single-threaded execution with respect to each partition with respect to persistent tasks.

Because the system is configured such that only a single persistent task at a time can be processed with respect to a partition, if that task is a partition-scoped snapshot, the effect is to block access to the partition to write requests directed to the partition during the snapshot persisting process. Any persistent tasks (e.g. write requests) received by cache service thread 401 and directed to the same partition are added to the work slot and association pile used by for work directed at the partition, but are not processed until the worker thread returns on completion (release) of the snapshot persisting task. Notably, the cache service thread continues to operate (is not suspended) and tasks directed at other partitions can still be processed through the work slots, association piles and worker threads other than the worker thread performing the persisting task. Moreover non-persistent tasks (e.g. read requests) can be processed on other thread in parallel even as to the partition being snapshot.

FIG. 4B shows a configuration where the number of worker threads 430 is less than the number of work slots 412. Where there are less worker threads than work slots, the number of association piles equals the number of work threads. Thus, FIG. 4B shows three worker threads 430a, 430b, 430c and three association piles 420a, 420b, and 420c. There are more work slots 410 than association piles 420, so some work slots must share piles. For example, the calling threads that enter work slots 410c and 410d may both place work in association pile 420c. However, all work related to a particular key is added through the same work slot and, thus, is still directed to the same (shared) association pile. As shown in FIG. 4B, each worker thread however has a dedicated association pile from which it removes work. However, if a worker thread has nothing to do, it attempts to pull work from another thread's pile before going to sleep. The association pile will still prevent polling of work directed to the same partition as works which has been polled but not yet released.

While various embodiments of the present invention have been described above, it should be understood that they have been presented by way of example, and not limitation. It will be apparent to persons skilled in the relevant art that various changes in form and detail can be made therein without departing from the spirit and scope of the invention.

Many features of the present invention can be performed in, using, or with the assistance of hardware, software, firmware, or combinations thereof. The present invention may be conveniently implemented using one or more conventional general purpose or specialized digital computer, computing device, machine, or microprocessor, including one or more processors, memory and/or computer readable storage media programmed according to the teachings of the present disclosure. Features of the invention may also be implemented in hardware using, for example, hardware components such as application specific integrated circuits (ASICs) and programmable logic device. Implementation of the hardware state machine so as to perform the functions described herein will be apparent to persons skilled in the relevant art.

Features of the present invention can be incorporated in software and/or firmware for controlling the hardware of a processing system, and for enabling a processing system to interact with other mechanisms utilizing the results of the present invention. Such software or firmware may include, but is not limited to, application code, device drivers, operating systems and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In embodiments, the storage medium or computer readable medium can be non-transitory.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting partition-scoped snapshot creation in a distributed data, the method comprising:
   providing a plurality of cluster nodes operating on a single cluster of computers connected to each other directly through a single switch;
   sending a snapshot request from a snapshot coordinator in the cluster to a cluster node of the plurality of nodes operating on the cluster, wherein the snapshot request includes a snapshot name and a list of a plurality of partitions stored on said cluster node;
   receiving the snapshot request at the cluster node;
   sequentially persisting, by the cluster node, a copy of each partition of the plurality of partitions identified in the list of partitions to a persistence store one partition at a time without quiescing a cache service operating on the cluster node performing the sequential persisting, wherein the persistence store comprises one of a disk and database;
   during said sequentially persisting of said each partition of the plurality of partitions one partition at a time, operating said cache service on the cluster node to allow read and write access to all partitions stored on the cluster node other than said one partition being persisted at the time;
   wherein sequentially persisting the copy of each partition identified in the list of partitions to the persistence store without quiescing the cache service operating on the cluster node comprises:
      generating, at the cluster node, a snapshot task for each partition in the list of partitions in the snapshot request; and
      executing each snapshot task on the cluster node to persist said each partition wherein the cluster node blocks persistent task on said each partition during executing of said each persistent task without quiescing the cache service operating on the cluster node.

2. The method of claim 1, wherein persisting the copy of each partition identified in the list of partitions to the persistence store without quiescing the cache service operating on the cluster node additionally comprises:
   generating, at the cluster node, a snapshot task for each partition in the list of partitions in the snapshot request;
   providing each snapshot task to an association pile on the cluster node;
   executing each snapshot task on the cluster node to persist said each partition wherein the association pile blocks execution of persistent tasks on said each partition during executing of said each snapshot task without quiescing the cache service operating on the cluster node.

3. The method of claim 1, wherein persisting the copy of each partition identified in the list of partitions to the persistence store without quiescing the cache service operating on the cluster node additionally comprises:
   generating, at the cluster node, a snapshot task for each partition in the list of partitions in the snapshot request;
   providing each snapshot task to an association pile on the cluster node;
   polling each snapshot task from the association pile using a thread of a thread pool on the cluster node.

4. The method of claim 1, wherein persisting the copy of each partition identified in the list of partitions to the persistence store without quiescing the cache service operating on the cluster node additionally comprises:
   generating, at the cluster node, a snapshot task for each partition in the list of partitions in the snapshot request;
   providing each snapshot task to an association pile on the cluster node;
   executing each snapshot task on a thread of a thread pool on the cluster node to persist said each partition wherein the association pile blocks polling of persistent tasks on said each partition by said thread pool during executing of said each snapshot task without quiescing the cache service operating on the cluster node.

5. The method of claim 1, wherein persisting the copy of each partition identified in the list of partitions to the persistence store without quiescing the cache service operating on the cluster node additionally comprises:
   generating, at the cluster node, a snapshot task for each partition in the list of partitions in the snapshot request;
   providing each snapshot task to an association pile on the cluster node;
   executing each snapshot task on a thread of a scalable thread pool on the cluster node to persist said each partition wherein the association pile blocks polling of persistent tasks on said each partition by said scalable thread pool during executing of said each snapshot task without quiescing the cache service operating on the cluster node.

6. The method of claim 1, further comprising:
   receiving at the snapshot coordinator a response from each cluster node indicative of a result of persisting a copy of each partition identified in the list of partitions to a persistence store.

7. The method of claim 1, further comprising:
   receiving at the snapshot coordinator a snapshot response from each cluster node indicative of a result of persisting a copy of each partition identified in the list of partitions to a persistence store wherein the result includes success, failure, and duration information for persisting a copy of each partition.

8. The method of claim 7, further comprising:
   transmitting another sending a snapshot request from a snapshot coordinator to a cluster node where persisting a copy of each partition failed.

9. The method of claim 7, further comprising:
   monitoring snapshot response with the snapshot coordinator, and using data from said snapshot responses to modify further snapshot requests sent from the snapshot coordinator.

10. A system comprising a distributed data grid configured to perform partition-scoped snapshot creation wherein:
a networked plurality of computer systems connected to each other directly through a single switch and operating as a single cluster, each computer system comprising a microprocessor and memory;
a plurality of cluster nodes operating in the cluster;
a snapshot coordinator operating on one of the plurality of computer systems in the cluster;
a persistence store comprising one of a disk and database;
wherein the distributed data grid is configured to perform steps comprising,
sending a snapshot request from a snapshot coordinator in the cluster to a cluster node of the plurality of cluster nodes operating in the cluster storing a plurality of partitions, wherein the snapshot request includes a snapshot name and a list of partitions,
receiving the snapshot request at the cluster node;
sequentially persisting, by the cluster node, a copy of each partition of the plurality of partitions identified in the list of partitions to a persistence store one partition at a time without quiescing a cache service operating on the cluster node performing the sequential persisting; and
during said sequentially persisting of said each partition of the plurality of partitions one partition at a time, operating said cache service on the cluster node to allow read and write access to all partitions stored on the cluster node other than said one partition being persisted at the time;
wherein sequentially persisting the copy of each partition identified in the list of partitions to the persistence store without quiescing the cache service operating on the cluster node comprises:
generating, at the cluster node, a snapshot task for each partition in the list of partitions in the snapshot request; and
executing each snapshot task on the cluster node to persist said each partition wherein the cluster node blocks persistent task on said each partition during executing of said each persistent task without quiescing the cache service operating on the cluster node.

11. The system of claim 10, wherein persisting the copy of each partition identified in the list of partitions to the persistence store without quiescing the cache service operating on the cluster node additionally comprises:
generating, at the cluster node, a snapshot task for each partition in the list of partitions in the snapshot request;
providing each snapshot task to an association pile on the cluster node;
executing each snapshot task on the cluster node to persist said each partition wherein the association pile blocks execution of persistent tasks on said each partition during executing of said each snapshot task without quiescing the cache service operating on the cluster node.

12. The system of claim 10, wherein persisting the copy of each partition identified in the list of partitions to the persistence store without quiescing the cache service operating on the cluster node additionally comprises:
generating, at the cluster node, a snapshot task for each partition in the list of partitions in the snapshot request;
providing each snapshot task to an association pile on the cluster node;
polling each snapshot task from the association pile using a thread of a thread pool on the cluster node.

13. The system of claim 10, wherein persisting the copy of each partition identified in the list of partitions to the persistence store without quiescing the cache service operating on the cluster node additionally comprises:
generating, at the cluster node, a snapshot task for each partition in the list of partitions in the snapshot request;
providing each snapshot task to an association pile on the cluster node;
executing each snapshot task on a thread of a thread pool on the cluster node to persist said each partition wherein the association pile blocks polling of persistent tasks on said each partition by said thread pool during executing of said each snapshot task without quiescing the cache service operating on the cluster node.

14. The system of claim 10, wherein persisting the copy of each partition identified in the list of partitions to the persistence store without quiescing the cache service operating on the cluster node additionally comprises:
generating, at the cluster node, a snapshot task for each partition in the list of partitions in the snapshot request;
providing each snapshot task to an association pile on the cluster node;
executing each snapshot task on a thread of a scalable thread pool on the cluster node to persist said each partition wherein the association pile blocks polling of persistent tasks on said each partition by said scalable thread pool during executing of said each snapshot task without quiescing the cache service operating on the cluster node.

15. The system of claim 10, wherein the distributed data is further configured to perform steps comprising:
receiving at the snapshot coordinator a response from each cluster node indicative of a result of persisting a copy of each partition identified in the list of partitions to a persistence store.

16. The system of claim 10, wherein the distributed data is further configured to perform steps comprising:
receiving at the snapshot coordinator a snapshot response from each cluster node indicative of a result of persisting a copy of each partition identified in the list of partitions to a persistence store wherein the result includes success, failure, and duration information for persisting a copy of each partition.

17. The system of claim 16, wherein the distributed data is further configured to perform steps comprising: monitoring snapshot responses with the snapshot coordinator, and using data from said snapshot responses to modify further snapshot requests sent from the snapshot coordinator.

18. A non-transitory computer-readable storage medium including instructions stored thereon for configuring a distributed data grid to support partition-scoped snapshot creation, which instructions, when executed, cause the distributed data grid to perform steps comprising:
providing a plurality of cluster nodes operating on a single cluster of computers connected to each other directly through a single switch;
sending a snapshot request from a snapshot coordinator in the cluster to a cluster node of the plurality of nodes operating on the cluster, wherein the snapshot request includes a snapshot name and a list of a plurality of partitions stored on said cluster node;
receiving the snapshot request at the cluster node;
sequentially persisting, by the cluster node, a copy of each partition of the plurality of partitions identified in the list of partitions to a persistence store one partition at a time without quiescing a cache service operating on the cluster node performing the sequential persisting, wherein the persistence store comprises one of a disk and database;

during said sequentially persisting of said each partition of the plurality of partitions one partition at a time, operating said cache service on the cluster node to allow read and write access to all partitions stored on the cluster node other than said one partition being persisted at the time;

wherein sequentially persisting the copy of each partition identified in the list of partitions to the persistence store without quiescing the cache service operating on the cluster node comprises:
  generating, at the cluster node, a snapshot task for each partition in the list of partitions in the snapshot request; and
  executing each snapshot task on the cluster node to persist said each partition wherein the cluster node blocks persistent task on said each partition during executing of said each persistent task without quiescing the cache service operating on the cluster node.

\* \* \* \* \*